(12) United States Patent
Liu et al.

(10) Patent No.: US 12,381,692 B2
(45) Date of Patent: Aug. 5, 2025

(54) TERMINAL APPARATUS, BASE STATION APPARATUS, AND COMMUNICATION METHOD

(71) Applicant: SHARP KABUSHIKI KAISHA, Sakai (JP)

(72) Inventors: Liqing Liu, Sakai (JP); Shohei Yamada, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 544 days.

(21) Appl. No.: 17/791,210

(22) PCT Filed: Jan. 21, 2021

(86) PCT No.: PCT/JP2021/002928
§ 371 (c)(1),
(2) Date: Jul. 7, 2022

(87) PCT Pub. No.: WO2021/149837
PCT Pub. Date: Jul. 29, 2021

(65) Prior Publication Data
US 2023/0023825 A1    Jan. 26, 2023

(30) Foreign Application Priority Data
Jan. 21, 2020  (JP) .................................. 2020-007609

(51) Int. Cl.
*H04L 5/00*  (2006.01)

(52) U.S. Cl.
CPC .......... *H04L 5/0057* (2013.01); *H04L 5/0048* (2013.01)

(58) Field of Classification Search
CPC ..... H04L 5/0057; H04L 5/001; H04L 5/0023; H04L 5/0091; H04L 5/0048; H04L 1/0027; H04W 24/10
See application file for complete search history.

(56) References Cited

U.S. PATENT DOCUMENTS

2019/0246421 A1* 8/2019 Zhou ........................ H04L 5/00

OTHER PUBLICATIONS

3GPP TS 38.214 V16.9.9, Dec. 2019, NR; Physical layer procedures for data (Year: 2019).*

(Continued)

*Primary Examiner* — Jamal Javaid
(74) *Attorney, Agent, or Firm* — ScienBiziP, P.C.

(57) ABSTRACT

A method by a user equipment (UE) is described. The method includes receiving, from a base station, a first radio resource control (RRC) parameter including a first list of one or more CSI trigger states, a second RRC parameter indicating a first total number of bits N_TS1 for a first CSI request field of a first DCI format, a third RRC parameter including a second list of one or more CSI trigger states, and a fourth RRC parameter indicating a second total number of bits N_TS2 for a second CSI request field of a second DCI format, determining a CSI trigger state in response to a CSI request field of a DCI format, wherein in a first case that a total number of the one or more CSI trigger states within the first list is greater than $2^{N\_TS1}$ 1, the processing circuitry is further configured to select one or more of the CSI trigger states out of the first list which are mapped to one or more codepoints of the first CSI request field of the first DCI format, in a second case that a total number of the one or more CSI trigger states within the second list is greater than $2^{N\_TS2}-1$, the processing circuitry is further configured to select one or more of the CSI trigger states out of the second list which are mapped to one or more codepoints of the second CSI request field of the second DCI format.

7 Claims, 7 Drawing Sheets

(56) References Cited

OTHER PUBLICATIONS

"3rd Generation Partnership Project; Technical Specification Group Radio Access Network; NR; Radio Resource Control (RRC) protocol specification(Release 15)", 3GPP TS 38.331 V15.8.0 (Dec. 2019).
"3rd Generation Partnership Project; Technical Specification Group Radio Access Network; NR; Medium Access Control (MAC) protocol specification(Release 15)", 3GPP TS 38.321 V15.8.0 (Dec. 2019).
"3rd Generation Partnership Project; Technical Specification Group Radio Access Network; NR; NR and NG-RAN Overall Description; Stage 2(Release 15)", 3GPP TS 38.300 V15.8.0 (Dec. 2019).
"3rd Generation Partnership Project; Technical Specification Group Radio Access Network; NR; Physical channels and modulation(Release 15)", 3GPP TS 38.211 V15.8.0 (Dec. 2019).
"3rd Generation Partnership Project; Technical Specification Group Radio Access Network; NR; Multiplexing and channel coding(Release 15)", 3GPP TS 38.212 V15.8.0 (Dec. 2019).
"3rd Generation Partnership Project; Technical Specification Group Radio Access Network; NR; Physical layer procedures for control(Release 15)", 3GPP TS 38.213 V15.8.0 (Dec. 2019).
"3rd Generation Partnership Project; Technical Specification Group Radio Access Network; NR; Physical layer procedures for data(Release 15)", 3GPP TS 38.214 V15.8.0 (Dec. 2019).
"3rd Generation Partnership Project; Technical Specification Group Radio Access Network; Evolved Universal Terrestrial Radio Access (E-UTRA) and NR; Multi-connectivity; Stage 2(Release 15)", 3GPP TS 37.340 V15.8.0 (Dec. 2019).
"3rd Generation Partnership Project; Technical Specification Group Radio Access Network; NR; Physical layer procedures for data(Release 16)", 3GPP TS 38.214 V16.0.0 (Dec. 2019).
Vivo, "Some clarifications for MAC CEs for beam management", R2-1800899, 3GPP TSG-RAN WG2 NR Ad hoc 1801, Vancouver, Canada, Jan. 22-26, 2018.
Sharp, "Remaining issues on PDCCH enhancements for NR URLLC", R1-2006563, 3GPP TSG RAN WG1 #102-e, e-Meeting, Aug. 17-28, 2020.

\* cited by examiner

| R | Serving Cell ID | BWP ID | Oct 1 |
|---|---|---|---|
| $T_7$ | $T_6$ | $T_5$ | $T_{i4}$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)*8+7}$ | $T_{(N-2)*8+6}$ | $T_{(N-2)*8+5}$ | $T_{(N-2)*8+4}$ | $T_{(N-2)*8+3}$ | $T_{(N-2)*8+2}$ | $T_{(N-2)*8+1}$ | $T_{(N-2)*8}$ | Oct N |

FIG. 2

TERMINAL APPARATUS, BASE STATION APPARATUS, AND COMMUNICATION METHOD

TECHNICAL FIELD

The present disclosure relates to a terminal apparatus, a base station apparatus, a communication method, and an integrated circuit.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. In a wireless communication system, a device may be simultaneously configured with one or more than one DCI formats to trigger an aperiodic CSI report for multiple service types. However, current existing systems and methods may only support one DCI format to trigger an aperiodic CSI report and one associated aperiodic CSI trigger state subselection MAC CE, which offer limited flexibility and efficiency for multiple service communication. As illustrated by this discussion, systems and methods according to the prevent invention, supporting different DCI formats to trigger CSI report, may improve communication flexibility and efficiency and may be beneficial.

BRIEF DESCRIPTION OF THE DRAWINGS

FIG. 2 illustrates one example 200 of aperiodic CSI trigger state subselection MAC CE.

DESCRIPTION OF EMBODIMENTS

Figure 1:
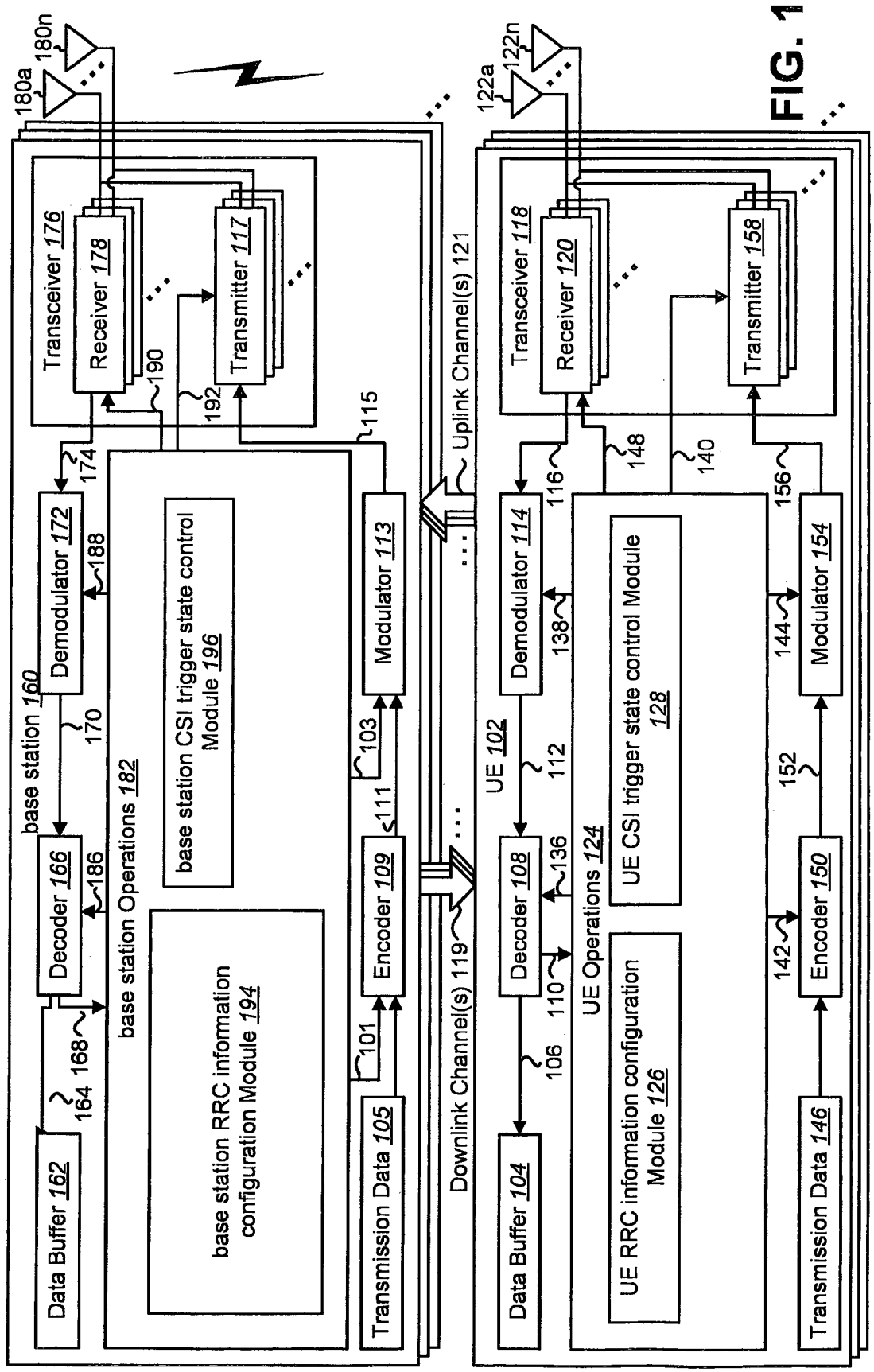
FIG. 1 is a block diagram illustrating one configuration of one or more base stations and one or more user equipments (UEs) in which systems and methods for search space configuration and/or DCI alignment may be implemented.

A user equipment (UE) is described. The UE includes reception circuitry configured to receive, from a base station, a first radio resource control (RRC) parameter including a first list of one or more CSI trigger states, a second RRC parameter indicating a first total number of bits N_TS1 for a first CSI request field of a first DCI format, a third RRC parameter including a second list of one or more CSI trigger states, and a fourth RRC parameter indicating a second total number of bits N_TS2 for a second CSI request field of a second DCI format, processing circuitry configured to determine a CSI trigger state in response to a CSI request field of a DCI format, wherein in a first case that a total number of the one or more CSI trigger states within the first list is greater than $2^{N\_TS1}-1$, the processing circuitry is further configured to select one or more of the CSI trigger states out of the first list which are mapped to one or more codepoints of the first CSI request field of the first DCI format, in a second case that a total number of the one or more CSI trigger states within the second list is greater than $2^{N\_TS2}-1$, the processing circuitry is further configured to select one or more of the CSI trigger states out of the second list which are mapped to one or more codepoints of the second CSI request field of the second DCI format.

A base station is described. The base station includes transmission circuitry configured to transmit, to a user equipment (UE), a first radio resource control (RRC) parameter including a first list of one or more CSI trigger states, a second RRC parameter indicating a first total number of bits N_TS1 for a first CSI request field of a first DCI format, a third RRC parameter including a second list of one or more CSI trigger states, and a fourth RRC parameter indicating a second total number of bits N_TS2 for a second CSI request field of a second DCI format, processing circuitry configured to determine a CSI trigger state, generate a CSI request field of a DCI format based on the determined CSI trigger state, wherein in a first case that a total number of the one or more CSI trigger states within the first list is greater than $2^{N\_TS1}-1$, the processing circuitry is further configured to select one or more of the CSI trigger states out of the first list which are mapped to one or more codepoints of the first CSI request field of the first DCI format, in a second case that a total number of the one or more CSI trigger states within the second list is greater than $2^{N\_TS2}-1$, the processing circuitry is further configured to select one or more of the CSI trigger states out of the second list which are mapped to one or more codepoints of the second CSI request field of the second DCI format.

A method by a user equipment (UE) is described. The method includes receiving, from a base station, a first radio resource control (RRC) parameter including a first list of one or more CSI trigger states, a second RRC parameter indicating a first total number of bits N_TS1 for a first CSI request field of a first DCI format, a third RRC parameter including a second list of one or more CSI trigger states, and a fourth RRC parameter indicating a second total number of bits N_TS2 for a second CSI request field of a second DCI format, determining a CSI trigger state in response to a CSI request field of a DCI format, wherein in a first case that a total number of the one or more CSI trigger states within the first list is greater than $2^{N\_TS1}-1$, the processing circuitry is further configured to select one or more of the CSI trigger states out of the first list which are mapped to one or more codepoints of the first CSI request field of the first DCI format, in a second case that a total number of the one or more CSI trigger states within the second list is greater than $2^{N\_TS2}-1$, the processing circuitry is further configured to select one or more of the CSI trigger states out of the second list which are mapped to one or more codepoints of the second CSI request field of the second DCI format.

A method by a base station is described. The method includes transmitting, to a user equipment (UE), a first radio resource control (RRC) parameter including a first list of one or more CSI trigger states, a second RRC parameter indicating a first total number of bits N_TS1 for a first CSI request field of a first DCI format, a third RRC parameter including a second list of one or more CSI trigger states, and a fourth RRC parameter indicating a second total number of bits N_TS2 for a second CSI request field of a second DCI format, determining a CSI trigger state, generate a CSI request field of a DCI format based on the determined CSI trigger state, wherein in a first case that a total number of the one or more CSI trigger states within the first list is greater than $2^{N\_TS1}-1$, the processing circuitry is further configured to select one or more of the CSI trigger states out of the first list which are mapped to one or more codepoints of the first CSI request field of the first DCI format, in a second case that a total number of the one or more CSI trigger states within the second list is greater than $2^{N\_TS1}-1$, the processing circuitry is further configured to select one or more of the CSI trigger states out of the second list which are mapped to one or more codepoints of the second CSI request field of the second DCI format.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.340, 38.211, 38.212, 38.213, 38.214, etc) for the New Radio Access (NR) and Next generation-Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, and/or 15, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G—core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBS).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (STAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer ⅔ point of view, aggregation of carriers with different numerologies may be supported in NR.

The main services and functions of the RRC sublayer may include the following:
Broadcast of System Information related to Access Stratum (AS) and Non Access Stratum (NAS);
Paging initiated by CN or RAN;
Establishment, maintenance and release of an RRC connection between the UE and NR RAN including:
Addition, modification and release of carrier aggregation;
Addition, modification and release of Dual Connectivity in NR or between LTE and NR;
Security functions including key management;
Establishment, configuration, maintenance and release of signaling radio bearers and data radio bearers;
Mobility functions including:
Handover;
UE cell selection and reselection and control of cell selection and reselection;

Context transfer at handover.
QoS management functions;
UE measurement reporting and control of the reporting;
NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:
  C (Cell)-RNTI: unique UE identification used as an identifier of the RRC Connection and for scheduling;
  CS (Configured Scheduling)-RNTI: unique UE identification used for Semi-Persistent Scheduling in the downlink;
  INT-RNTI: identification of pre-emption in the downlink;
  P-RNTI: identification of Paging and System Information change notification in the downlink;
  SI-RNTI: identification of Broadcast and System Information in the downlink;
  SP-CSI-RNTI: unique UE identification used for semi-persistent CSI reporting on PUSCH;
For power and slot format control, the following identities are used:
  SFI-RNTI: identification of slot format;
  TPC-PUCCH-RNTI: unique UE identification to control the power of PUCCH;
  TPC-PUSCH-RNTI: unique UE identification to control the power of PUSCH;
  TPC-SRS-RNTI: unique UE identification to control the power of SRS;
During the random access procedure, the following identities are also used:
  RA-RNTI: identification of the Random Access Response in the downlink;
  Temporary C-RNTI: UE identification temporarily used for scheduling during the random access procedure;
  Random value for contention resolution: UE identification temporarily used for contention resolution purposes during the random access procedure.
For NR connected to 5GC, the following UE identities are used at NG-RAN level:
  I-RNTI: used to identify the UE context in RRC INACTIVE.

The size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 4.2-1 of [TS 38.211] where μ and the cyclic prefix for a bandwidth part (BWP) are obtained from the higher-layer parameter subcarrierSpacing and cyclicPrefix, respectively.

The size of various fields in the time domain may be expressed as a number of time units $T_s=1/(15000 \times 2,048)$ seconds. Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing (SCS) configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. $N_{slot}^{subframe,\mu}$ is the number of slots per subframe for subcarrier spacing configuration μ. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for supporting one or more DCI formats to trigger an aperiodic CSI report may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE CSI trigger state control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process RRC parameters indicating one or more CSI trigger state. The UE RRC information configuration module 126 may process MAC CE indicating selected one or more of CSI trigger state. The UE CSI trigger state control module 128 may determine a CSI trigger state in response to a CSI request field based on the processing output from the UE RRC information configuration module 126.

The UE operations module 124 may provide information 148 to the one or more receivers 120. For example, the UE operations module 124 may inform the receiver(s) 120 when or when not to receive transmissions based on the Radio Resource Control (RRC) message (e.g, broadcasted system information, RRC reconfiguration message), MAC control element, and/or the DCI (Downlink Control Information). The UE operations module 124 may provide information 148, including the CSI report configuration, to the one or more receivers 120. The UE operation module 124 may inform the receiver(s) 120 when or where to receive/measure the CSI-RS for channel state estimation.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station CSI trigger state control module 196. The base station operations module 182 may include PHY entities, MAC entities, RLC entities, PDCP entities, and an RRC entity.

The base station RRC information configuration module 194 may generate RRC parameters including one or more CSI trigger states. The base station DCI control module 196 may determine, for UE(s), an aperiodic CSI trigger state based on the output from the base station RRC information configuration module 195. The base station DCI control module 196 may generate a CSI request field based on the determined CSI trigger state.

The base station operations module 182 may provide information 190 to the one or more receivers 178. For example, the base station operations module 182 may inform the receiver(s) 178 when or when not to receive transmissions based on the RRC message (e.g, broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. A RRC message may include one or more RRC parameters. A RRC message may be sent on a broadcast control channel (BCCH) logical channel, a common control channel (CCCH) logical channel or a dedicated control channel (DCCH) logical channel.

Hereinafter, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'. Additionally or alternatively, 'a RRC parameter is (not) provided' may also refer to 'a base station may (not) transmit, to a base station, an RRC message including a RRC parameters'.

A base station may transmit a RRC message including one or more RRC parameters related to BWP configuration to a UE. A UE may receive the RRC message including one or more RRC parameters related to BWP configuration from a base station. For each cell, the base station may configure at least an initial downlink BWP (initial DL BWP) and one initial uplink bandwidth parts (initial UL BWP) to the UE. Furthermore, the base station may configure additional UL and DL BWPs to the UE for a cell.

A RRC parameters initialDownlinkBWP may indicate the initial DL BWP configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCG or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous PRBs, starting from a PRB with the lowest index and ending at a PRB with the highest index among PRBs of a CORESET for Type0-PDCCH CSS set (i.e., CORESET 0), and a SCS and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

A base station may transmit a RRC message including one or more RRC parameters related to CORESET configuration. A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). A RRC parameter related to initial DL BWP configuration may also include the RRC parameter ControlResourceSetZero. A RRC parameter ControlResourceSet is used to configure a time and frequency CORESET other than CORESET 0. A RRC parameter ControlResourceSetId included in the ControlResourceSet is CORESET index, used to identify a CORESET within a serving cell.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, or SearchSpace-v16) defines how and where to search for PDCCH candidates. The RRC parameter(s) related to search space configuration (e.g. SearchSpace, SearchSpace-v16) may have different information element structures. 'search/monitor for PDCCH candidate for a DCI format' may also refer to 'monitor/search for a DCI format' for short.

The RRC parameter SearchSpace with an information element structure A is related to search space configuration. The RRC parameters search space may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Here, the RRC parameter searchSpaceId is an identity or an index of a search space. The RRC parameter searchSpaceId is used to identify a search space. Or rather, the RRC parameter serchSpaceId provide a search space set index s, 0<=s<40. Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResource- SetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

As above-mentioned, the RRC parameter SearchSpace with information element structure A is capable of indicating that the search space set s is a CSS (e.g. a CSS set) or a USS (e.g. a USS set). A base station may configure a UE to whether monitor PDCCH candidates for DCI format 0_0 and DCI format 1_0, or for DCI format 0_1 and DCI format 1_1 in a USS set via the RRC parameter SearchSpace with information element structure A. That is, the base station may not configure a UE to monitor PDCCH candidates for a different DCI format(s) other than the existing DCI format(s) {DCI format 0_0, DCI format 1_0, DCI format 0_1, DCI format 1_1} in the USS set via the RRC parameter SearchSpace with information element structure A. In other words, the UE may, based on the received RRC parameter SearchSpace from the base station, monitor PDCCH candidates either for DCI format 0_0 and DCI format 1_0, or for DCI format 0_1 and DCI format 1_1 in a USS. The UE may be not be configured to monitor PDCCH candidates for a different DCI format(s) other than the existing DCI format(s) {DCI format 0_0, DCI format 1_0, DCI format 0_1, DCI format 1_1} in the USS.

Communication with new service traffic type like (but not limited to) URLLC may require new DCI format(s) design other than the existing DCI formats. For example, some new fields may be introduced in a new DCI format to implement different communication features. For example, some fields included in the existing DCI formats may be not necessary any more to adapt different communication features. In order to implement communication feature with different service traffic types, different DCI formats may be generated according to different service traffic types. Introduction of new DCI format(s) other than the existing DCI formats would be beneficial and efficient for communication with a new service traffic type like URLLC between based station(s) and UE(s). Hence, the RRC parameter SearchSpace with current information element structure A may be problematic, which is incapable of indicating a new DCI format. It would be beneficial to introduce a RRC parameter related to search space configuration with a new information element structure so that the base station may indicate/configure a UE to monitor PDCCH candidates for new DCI format(s) other than the existing DCI formats in a USS.

A RRC parameter SearchSpace-r16 (or SearchSpace) with an information element structure B is related to search space configuration. The RRC parameter SearchSpace-r16 (or SearchSpace) with an information element structure B may include a plurality of RRC parameters as like, searchSpaceId, controlResourceSetId, monitoringSlotPeriodicityAndOffset, duration, monitoringSymbolsWithinSlot, nrofCandidates, searchSpaceType-r16. Some of the above-mentioned RRC parameters may be present or absent in the RRC parameters SearchSpace-r16. The searchSpaceType-r16 included in RRC parameter SearchSpace-r16 with an information element structure B may be different from the searchSpaceType included in the RRC parameter SearchSpace with information element structure A. The searchSpaceType-r16 may only indicate that the search space set s is a USS set. The searchSpaceType-r16 may not be used to indicate that the search space set s is a CSS set. The RRC parameter searchSpaceType-r16 may include ue-Specific. The RRC parameter searchSpaceType-r16 may not include common. The RRC parameter searchSpaceType-r16 may also include dci-Format-r16.

The dci-Format-r16 may be used to indicate whether the UE monitors PDCCH candidates in the USS for DCI formats 0_1 and 1_1, or for DCI formats 0_2 and 1_2. That is, the dci-Format-r16 may be used to indicate which for DCI formats 0_0 and 1_0, or for DCI formats 0_2 and 1_2, the UE monitors PDCCH candidates in the USS. Additionally or alternatively, the dci-Format-v16 may be used to indicate which for DCI formats 0_0 and 1_0, or for DCI formats 0_1 and 1_1, or for DCI formats 0_2 and 1_2, the UE monitors PDCCH candidates in the USS. Additionally or alternatively, the dci-Format-v16 may be used to indicate which for DCI formats 0_2, or for DCI format 1_2, the UE monitors PDCCH candidates in the USS. Additionally or alternatively, the RRC parameter searchSpaceType-v16 may not include a RRC parameter (e.g. dci-Format-v16). That is, if a USS is configured/provided by the RRC parameter SearchSpace-v16, the UE may implicitly determine to monitor PDCCH candidates in the USS for DCI formats 02 and/or 12.

Additionally, or alternatively, a RRC parameter SearchSpace-v16 with an information element structure B may include a RRC parameter ue-Specific-v16. The ue-Specific-v16 is used to configure the search space as a USS set. The RRC parameter SearchSpace-v16 with an information element structure B may not include a RRC parameter common which is used to configure a search space set s as a CSS set. The RRC parameter ue-Specific-v16 may include a RRC parameter formats0-2-And-1-2. The RRC parameter formats0-2-And-1-2 may configure a UE to monitor PDCCH candidates in the USS set for DCI format 0_2 and DCI format 1_2. Additionally or alternatively, the RRC parameter formats0-2-And-1-2 may configure a UE to monitor PDCCH candidates in the USS set for DCI format 0_2 or for DCI format 1_2.

Additionally, or alternatively, the RRC parameter SearchSpace-v16 with an information element structure B is not capable of indicating that the search space set s is a CSS (e.g. a CSS set). The RRC parameter SearchSpace-v16 with an information element structure B is capable of indicating that the search space set s is a USS. The RRC parameter SearchSpace with an information element structure A is capable of indicating that the search space set s is a CSS (e.g. a CSS set) or a USS (e.g. a USS set).

Additionally, or alternatively, the RRC parameter SearchSpace-v16 with an information element structure C is related to search space configuration. The RRC parameter SearchSpace-v16 with an information element structure C may include a RRC parameter searchSpaceType-v16. The RRC parameters common, ue-Specific, ue-Specific-v16 included in searchSpaceType-v16, may be used to indicate that the search space set s is a CSS set, a USS set A, or a USS set B, respectively. The USS set A (ue-Specific) may indicate whether a UE monitor for DCI formats 0_0 and 1_0 or for DCI formats 0_1 and 1_1 in the USS set A. A RRC parameter nrofCandidates-v16, which may be included in SearchSpace-v16 but may not be included in ue-Specific, may provide a number of PDCCH candidates per CCE aggregation level L for DCI formats 0_0 and 1_0 or for DCI formats 0_1 and 1_1. The USS set B (ue-Specific-v16) may indicate that a UE may monitor for DCI formats 0_2 and 1_2 in the USS set. Furthermore, the ue-Specific-v16 may further include a RRC parameter nrofCandidates-v16 which may provide a number of PDCCH candidates per CCE aggregation level L for DCI formats 0_2 and 1_2. Hence, The RRC parameter SearchSpace-v16 with an information element structure C is capable of indicating that a search space set is a CSS set, a first USS set (USS set A), or a second USS set (USS set B). The CSS set (common) may indicate that a UE may monitor for DCI formats 0_0 and 1_0 in the CSS set.

According to another example, a RRC parameter searchSpaceType-v16 may include either a common or a ue-Specific and but may not include ue-Specific-v16. In this case, the RRC parameter dci-Formats included in ue-Specific may indicate whether a UE may monitor PDCCH candidates for DCI format 0_0 and DCI format 1_0, or for DCI format 0_1 and DCI format 1_1, or for DCI format 02 and DCI format 1_2 in the USS set. Furthermore, in a case that dci-Formats indicates a UE to monitor PDCCH candidates for DCI format 0_2 and DCI format 1_2, the dci-Formats may further include a RRC parameter nrofCandidates-v16 which may provide a number of PDCCH candidates per CCE aggregation level L for the DCI format 0_2 and DCI format 1_2. Otherwise, the RRC parameter nrofCandidates-v16 may be absent in the dci-Formats.

Additionally or alternatively, the RRC parameter searchSpaceType-r16 is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats-r16 indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for.

Additionally or alternatively, the RRC parameter searchSpaceType-r16 is used to indicate that the search space set s is a USS set. That is, the RRC parameter searchSpaceType-r16 may not be used to indicate that the search space set s is a CSS set. The RRC parameter searchSpaceType-r16 may only include a ue-Specific. The RRC parameter searchSpaceType-r16 may not include a common. The RRC parameter ue-Specific configures the search space set s as a USS set. The RRC parameter ue-Specific may include dci-Formats-r16. The RRC parameter dci-Formats-r16 indicates to monitor PDCCH candidates either for DCI format 0_1 and DCI format 1_1, or for DCI format 0_2 and DCI format 1_2 in search space set s. That is, the RRC parameter searchSpaceType-16 may indicate a USS set as well as DCI formats to monitor for.

A PDCCH may consist of one or more control channel elements (CCEs). A CCE may consist of 6 resource element groups (REGs). A REG may equal one resource block during one OFDM symbol. The REG within a control-resource set are numbered in increasing order in a time-first manner, starting with 0 for the first OFDM symbol and the lowest-numbered resource block in the control resource set. A UE can be configured with multiple control-resource sets. Each control-resource set is associated with one CCE-to-REG mapping only. The CCE-to-REG mapping for a control-resource set can be interleaved or non-interleaved and is described by REG bundles as in [TS 38.211]. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. A UE may monitor a set of PDCCH candidates in one or more control Resource set (CORESET) on an active DL BWP on an activated cell. Monitoring means decoding each PDCCH candidate according to the monitored DCI formats. The number of CCEs for PDCCH channel estimation may refer to the number of CCEs for PDCCH candidates to be monitored. As mentioned above, a PDCCH candidate may consist of one or more CCEs according to corresponding CCE aggregation level L. That is, a PDCCH candidate per CCE aggregation level L may consist of L CCEs. For example, a PDCCH candidate configured for CCE aggregation level 16 may consist of 16 CCEs.

A set of PDCCH candidates for a UE to monitor is defined in terms of PDCCH search space sets. A PDCCH candidate for a search space set s may correspond to a set of CCEs in a CORESET associated with the search space set s. In the present disclosure, the term "PDCCH search space sets" may also refer to "PDCCH search space". In the present disclosure, the term "search space sets" may also refer to "search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE. In other words, a UE can determine the CCE indexes for aggregation level L corresponding to PDCCH candidates of a USS for a USS set based on the value of C-RNTI addressed to the UE. The UE can determine the CCE indexes for aggregation level L corresponding to PDCCH candidates of a CSS for a CSS set without the value of C-RNTI addressed to the UE.

A UE may monitor a set of PDCCH candidates in one or more of the following search space sets

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSystemInformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI or a TC-RNTI on the primary cell
- a Type2-PDCCH CSS set configured by paging-SearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, CI-RNTI, or TPC-SRS-RNTI and, only for the primary cell, C-RNTI, MCS-C-RNTI, or CS-RNTI(s), and
- a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

DCI formats (or DCI) may be clarified as DCI format 0_0, DCI format 1_0, DCI format 1_1 (DCI format C), DCI format 0_1 (DCI format D), DCI format 1_2 (DCI format E), DCI format 0_2 (DCI format F), and so on.

DCI format 1_0 may be used for the scheduling of PDSCH in one cell. A UE may monitor the DCI format 1_0 with CRC scrambled by C-RNTI or CS-RNTI or MCS-C-RNTI or P-RNTI or SI-RNTI or RA-RNTI or TC-RNTI. The UE may monitor the DCI format 0_0 in a CSS (e.g. a CSS set) or a USS (e.g. a USS set). DCI format 0_0 may be used for the scheduling of PUSCH in one cell. A UE may monitor the DCI format 0_0 with CRC scrambled by C-RNTI or CS-RNTI or MCS-C-RNTI or TC-RNTI. The UE may monitor the DCI format 0_0 in a CSS (e.g. a CSS set) or a USS (e.g. a USS set).

Furthermore, the DCI format 1_0 monitored in a CSS may be used for the scheduling of broadcasting data. The DCI format 1_0 monitored in a CSS may be also used for the scheduling of UE-specific data. The DCI format 0_0 may be used for the scheduling of UE-specific data.

DCI format 0_0 may include predefined fields with fixed bits except for the 'Frequency domain resource assignment' field. The fields for DCI format 0_0 sequentially correspond to, 'Identifier for DCI formats' field with 1 bit, 'Frequency domain resource assignment' field, 'Time domain resource assignment' field with 4 bits, 'Frequency hopping flag' field with 1 bit, 'Modulation and coding scheme' field with 5 bits, 'New data indicator' field with 1 bit, 'Redundancy version' field with 2 bits, 'HARQ process number' field with 4 bits, 'TPC command for scheduled PUSCH' field with 2 bits, 'UL/SUL indicator' field with 1 bit. The size of the 'Frequency domain resource assignment' field for DCI format 0_0 may be determined based on a size of a UL bandwidth part. For example, the size of the 'Frequency domain resource assignment' field may be determined based on Formula (1) $\text{ceil}(\log_2(N_{RB}^{UL,BWP} (N_{RB}^{UL,BWP}+1)/2))$ wherein the $N_{RB}^{UL,BWP}$ is a size of UL bandwidth part. The function ceil(x) means the function that takes as input a real number x and gives as output the least integer greater than or equal to x.

DCI format 1_0 may include predefined fields with fixed bits except for the 'Frequency domain resource assignment' field. The fields for DCI format 1_0 sequentially correspond to, 'Identifier for DCI formats' field with 1 bit, 'Frequency domain resource assignment' field, 'Time domain resource assignment' field with 4 bits, 'VRB-to-PRB mapping' field with 1 bit, 'Modulation and coding scheme' field with 5 bits, 'New data indicator' field with 1 bit, 'Redundancy version' field with 2 bits, 'HARQ process number' field with 4 bits, 'Downlink assignment index' field with 2 bits, 'TPC command for scheduled PUCCH' field with 2 bits, 'PUCCH resource indicator' fie Id with 3 bits, 'PDSCH-to-HARQ_feedback timing indicator' field with 3 bits. The size of the 'Frequency domain resource assignment' fie Id for DCI format 1_0 may be determined based on a size of a DL bandwidth part, and/or a size of CORESET 0. For example, the size of the 'Frequency domain resource assignment' field may be determined based on Formula (2) $\text{ceil}(\log_2(N_{RB}^{DL,BWP} (N_{RB}^{DL,BWP}+1)/2))$ wherein the $N_{RB}^{DL,BWP}$ is a size of UL bandwidth part or a size of CORESET 0.

DCI format 0_0 and DCI format 1_0 can be configured to be monitored in a CSS (e.g. a CSS set) or a USS (e.g. a USS set). The DCI format 0_0 and DCI format 1_0 being monitored in a CSS may be also called as default DCI formats. In other words, the DCI format 0_0 and DCI format 1_0 being monitored in a USS may not be called as default DCI formats.

DCI format C may refer to DCI format (e.g. DCI format 1_1) monitored in a USS. DCI format C (DCI format 1_1) may be used for the scheduling of PDSCH in one cell. DCI format 1_1 may schedule up to two transport blocks for one PDSCH. A UE may monitor the DCI format 1_1 with CRC scrambled by C-RNTI or CS-RNTI or MCS-C-RNTI. The UE may monitor the DCI format 1_1 in a USS The UE may not monitor the DCI format 1_1 in a CSS. DCI format 1_1 may be used for the scheduling of UE-specific data. DCI format 1_1 may include a plurality of fields with fixed bits and a plurality of fields with variable bits. The size of fields with variable bits are determined based on corresponding RRC configuration.

DCI format D may refer to DCI format (e.g. DCI format 0_1) monitored in a USS. DCI format 0_1 may be used for the scheduling of PUSCH in one cell. DCI format 0_1 may schedule up to two transport blocks for one PUSCH. A UE may monitor the DCI format 0_1 with CRC scrambled by C-RNTI or CS-RNTI or SP-CSI-RNTI or MCS-C-RNTI. The UE may monitor the DCI format 0_1 in a USS. The UE may not monitor the DCI format 0_1 in a CSS. DCI format 0_1 may be used for the scheduling of UE-specific data. DCI format 0_1 may include a plurality of fields with fixed bits and a plurality of fields with variable bits. The size of fields with variable bits are determined based on corresponding RRC configuration.

DCI format E may refer to DCI format (e.g. DCI format 1_2) monitored in a USS. DCI format 1_2 may be used for the scheduling of PDSCH in one cell. DCI format 1_2 may schedule one transport block for one PDSCH. A UE may monitor the DCI format 1_2 in a USS. The UE may not monitor the DCI format 1_2 in a CSS. DCI format 1_2 may be used for the scheduling of UE-specific data. DCI format 1_2 may include a plurality of fields with fixed bits and a plurality of fields with variable bits. The size of fields with variable bits are determined based on corresponding RRC configuration. DCI format 1_2 may not consist of some fields (e.g. 'CBG transmission information' field), which may be present in DCI format 1_1.

DCI format F may refer to DCI format (e.g. DCI format 0_2) monitored in a USS. DCI format 0_2 may be used for the scheduling of PUSCH in one cell. DCI format 0_2 may schedule one transport block for one PUSCH. Additionally, UE may monitor the DCI format F with CRC scrambled by C-RNTI or CS-RNTI or SP-CSI-RNTI or MCS-C-RNTI. The UE may monitor the DCI format 0_2 in a USS. The UE may not monitor the DCI format 0_2 in a CSS. DCI format 0_2 may be used for the scheduling of UE-specific data. DCI format 0_2 may include a plurality of fields with fixed bits and a plurality of fields with variable bits. The size of fields with variable bits are determined based on corresponding RRC configuration. DCI format 0_2 may not consist of some fields (e.g. 'CBG transmission information' field), which may be present in DCI format 0_1.

DCI formats C and D may be used to schedule traffic service data (e.g. eMBB). For example, DCI format C may be used to schedule a first PDSCH transmitting eMBB data. DCI format D may be used to schedule a first PUSCH transmitting eMBB data.

DCI formats E and F may be used to schedule traffic service data (e.g. URLLC). For example, DCI format E may be used to schedule a second PDSCH transmitting URLLC data. DCI format F may be used to schedule a second PUSCH transmitting URLLC data. Additionally or alternatively, DCI formats E and F may be DCI formats with CRC scrambled by a second RNTI which is different from a first RNTI(s) for DCI formats C and D. That is, DCI format E may be a DCI format 1_1 with CRC scrambled by a second RNTI. DCI format C may be a DCI format 1_1 with CRC scrambled by a first RNTI (e.g. C-RNTI). DCI format F may be a DCI format 0_1 with CRC scrambled by a second RNTI. DCI format D may be a DCI format 0_1 with CRC scrambled by a first RNTI (e.g. C-RNTI).

Additionally or alternatively, DCI formats C and D may be transmitted in a first CORESET, while DCI formats E and F may be transmitted in a second CORESET which is different from the first CORESET. A RRC parameter, which is used to identity the DCI formats configured by dci-Formats are DCI formats C and D or DCI formats E and F, may be present (or set to 'enable') in a CORESET configuration for the second CORESET. The RRC parameter may be absent (or set to 'disable') in a CORESET configuration for the first CORESET. As mentioned above, a CORESET is associated with a search space set s, in which DCI formats are configured to monitor. For example, dci-Formats may indicate to monitor PDCCH candidates for DCI format 0_1 and DCI format 1_1 in search space set s. If the RRC parameter is absent in the CORESET configuration for the associated CORESET, the DCI format 0_1 and DCI format 1_1 monitored in the CORESET may refer to DCI format C and D. If the RRC parameter is present in the CORESET configuration for the associated CORESET, the DCI format 0_1 and DCI format 1_1 monitored in the CORESET may refer to DCI format E and F. That is, the DCI format C and D may be the DCI format 0_1 and DCI format 1_1 monitored in the first CORESET. The DCI format C and D may be the DCI format 0_1 and DCI format 1_1 monitored in the second CORESET.

Additionally or alternatively, DCI formats C and D may be transmitted in a first search space set s, while DCI formats E and F may be transmitted in a second search space set s which is different from the first search space set s. DCI formats C and D may be transmitted in a first search space set s, while DCI formats E and F may also be transmitted in the first search space set s. A RRC parameter, which is used to identity the DCI formats configured by dci-Formats are DCI formats C and D or DCI formats E and F, may be present (or set to 'enable') in ue-Specific (SearchSpace, or SearchSpace-v16) for the second search space set s. The RRC parameter may be absent (or set to 'disable') in ue-Specific (SearchSpace, or SearchSpace-v16) for the first search space set s. For example, dci-Formats may indicate to monitor PDCCH candidates for DCI format 0_1 and DCI format 1_1 in search space set s. If the RRC parameter is absent in ue-Specific for the search space set s, the DCI format 0_1 and DCI format 1_1 monitored in the search space set s may refer to DCI format C and D. If the RRC parameter is present in ue-Specific for the search space set s, the DCI format 0_1 and DCI format 1_1 monitored in the search space set s may refer to DCI format E and F. That is, the DCI format C and D may be the DCI format 0_1 and DCI format 1_1 configured in the first search space set s. The DCI format E and F may be the DCI format 0_1 and DCI format 1_1 configured in the second search space set s.

DCI (format) used for the downlink scheduling is also referred to as downlink grant or downlink assignment. DCI (format) used for the uplink scheduling is also referred to as uplink grant or uplink assignment.

Different DCI formats (DCI) may consist of different fields. The fields defined in the DCI formats maybe mapped to a number of information bits. Each field may be mapped to 0, 1, or more bits of the information bits. That is, a field may include 0, 1, or more bits of the information bits. In a case that a field is mapped to 0 bit, the UE may determine the field is absent in the DCI format. In other words, if a field is mapped to 1, or more bits, the UE may determine the field is present in the DCI format. Furthermore, a field may also include 0, 1, or more zero-padding bit(s). If the number of the information bits in DCI format is less than 12 bits, zero may be appended to the DCI format until the payload size equals 12. A DCI format may include a plurality of fields and 0, 1, or more zero-padding bit(s). The payload size of a DCI format may be equal to a quantity of the information bits and zero-padding bits(s). The number of the zero-padding bits may be 0, 1, or more bits for a DCI format. Herein, the size of a DCI format (DCI format size, DCI size) may refer to the payload size of the DCI format. Alternatively, or additionally, the size of a DCI format may also refer to the size of the information bits of the DCI format.

DCI format 0_1 and DCI format 0_2 may respectively consist of a CSI request field, which is used to request UE(s) to perform an aperiodic CSI report. The CSI request field may indicate a CSI trigger state. Upon reception of a CSI request field with a non-zero value being associated with a CSI trigger state, the UE may perform measurement of CSI-RS, CSI-IM and/or SSB (reference signals) and perform an aperiodic CSI reporting on PUSCH according to the indicated CSI trigger state.

The UE may perform measurement for deriving the CSI based on the reference signal such as the SSB/PBCH-block and/or CSI-RS in the determined CSI reference resource. The CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP (Layer 1 reference signal received power).

A UE procedure for triggering channel state information (CSI) is illustrated below.

A UE 102 may receive, from a base station 160, a RRC parameter CSI-AperiodicTriggerStateList indicating(including) a list of one or more trigger states (or aperiodic trigger states). That is, the RRC parameter AperiodicTriggerStateList may configure the UE 102 with a list of one or more trigger states for aperiodic CSI reporting. In the present disclosure, the term "trigger states" may also refer to "CSI trigger (triggering) state" or "configured CSI trigger (triggering) state". The list of trigger states given by the RRC parameter CSI-AperiodicTriggerStateList may contain one or more trigger state(s). Each trigger state is indicated by CSI-AperiodicTriggerState. In other words, the RRC parameter CSI-AperiodicTriggerStateList contain a list of RRC parameters CSI-AperiodicTriggerState. Each trigger state in the CSI-AperiodicTrigerStateList may contain a list of associated RRC parameter CST ReportConfig indicating the Resource Set IDs for channel and optionally for interference. The CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included.

The UE 102 may further receive, from the base station 160, a RRC parameter reportTriggerSize to configure the number of bits N_TS1 in the CSI request field of DCI format 0_1. The RRC parameter reportTriggerSize is used to indicate a integer value N_TS1 which is the size of CSI request field of the DCI format 0_1. The integer value N_TS1 is one element in the set {0, 1, 2, 3, 4, 5, 6}. The bit width (size) of the CSI request field of the DCI format 0_1 is determined by the RRC parameter reportTriggerSize. Here, in a case that the UE 102 is not configured to monitor the DCI format 0_1, the UE 102 may not receive, from the base station 160, the RRC parameter CSI-AperiodicTriggerStateList and the RRC parameter reportTriggerSize. In this case, the base station may not transmit, to the UE 102, the RRC parameter CSI-AperiodicTriggerStateList and the RRC parameter reportTriggerSize. In other words, in a case that the UE 102 is configured to monitor the DCI format 0_1, the base station may transmit, to the UE 102, the RRC parameter CSI-AperiodicTriggerStateList and the RRC parameter reportTriggerSize. The UE 102 may receive, from the base station 160, the RRC parameter CSI-AperiodicTriggerStateList and the RRC parameter reportTriggerSize. The RRC parameter CSI-AperiodicTriggerStateList and the RRC parameter reportTriggerSize are applied to the DCI format 0_1.

The UE 102 may also receive, from a base station 160, a RRC parameter CSI-AperiodicTriggerStateList-ForDCIFormat0_2 indicating(including) a list of one or more trigger states (or aperiodic trigger states). That is, the RRC parameter AperiodicTriggerStateList-ForDCIFormat0_2 may configure the UE 102 with a list of one or more trigger states for aperiodic CSI reporting. The list of trigger states given by the RRC parameter CSI-AperiodicTriggerStateList-ForDCIFormat0_2 may contain one or more trigger state(s). Each trigger state is indicated by CSI-AperiodicTriggerState. In other words, the RRC parameter CSI-AperiodicTriggerStateList-ForDCIFormat0_2 contain a list of RRC parameters CSI-AperiodicTriggerState. Each trigger state in the CSI-AperiodicTrigerStateList-ForDCIFormat0_2 may contain a list of associated RRC parameter CSI-ReportConfigs indicating the Resource Set IDs for channel and optionally for interference.

The UE 102 may further receive, from the base station 160, a RRC parameter reportTriggerSize-ForDCIFormat0_2 to configure the number of bits N_TS2 in the CSI request field of DCI format 0_2. The RRC parameter reportTriggerSize-ForDCIFormat0_2 is used to indicate a integer value N_TS2 which is the size of CSI request field of the DCI format 0_2. The integer value N_TS2 is one element in the set {0, 1, 2, 3, 4, 5, 6}. The bit width (size) of the CSI request field of the DCI format 0_2 is determined by the RRC parameter reportTriggerSize-ForDCIFormat0_2. Here, in a case that the UE 102 is not configured to monitor the DCI format 0_2, the UE 102 may not receive, from the base station 160, the RRC parameter CSI-AperiodicTriggerStateList-ForDCIFormat0_2 and the RRC parameter reportTriggerSize-ForDCIFormat0_2. In this case, the base station may not transmit, to the UE 102, the RRC parameter CSI-AperiodicTriggerStateList-ForDCIFormat0_2 and the RRC parameter reportTriggerSize-ForDCIFormat0_2. In other words, in a case that the UE 102 is configured to monitor the DCI format 0_2, the UE 102 may receive, from the base station 160, the RRC parameter CSI-AperiodicTriggerStateList-ForDCIFormat0_2 and the RRC parameter reportTriggerSize-ForDCIFormat0_2. The base station may transmit, to the UE 102, the RRC parameter CSI-AperiodicTriggerStateList-ForDCIFormat0_2 and the RRC parameter reportTriggerSize-ForDCIFormat0_2. The RRC parameter CSI-AperiodicTriggerStateList-ForDCIFormat0_2 and the RRC parameter reportTriggerSize-ForDCIFormat0_2 is applied to the DCI format 0_2. The RRC parameter CSI-AperiodicTriggerStateList-ForDCIFormat0_2 and the RRC parameter reportTriggerSize-ForDCIFormat0_2 is not applied to the DCI format 0_1.

The maximum number of the trigger states within the AperiodicTriggerStateList can be set to a value of 128. The maximum number of the trigger states within the CSI-AperiodicTriggerStateList-ForDCIFormat0_2 can be same as that of the trigger states within the CSI-AperiodicTrigerStateList. The maximum number of the trigger states within the CSI-AperiodicTriggerStateList-ForDCIFormat0_2 can be different from that of the trigger states within the CSI-AperiodicTriggerStateList. For example, the maximum number of the trigger states within the CSI-AperiodicTriggerStateList-ForDCIFormat0_2 can be set to a value as $2^{N\_TS2}-1$.

As above-mentioned, the size of CSI request field in DCI format 0_1 or DCI format 0_2 is determined by the RRC parameter reportTriggerSize and the RRC parameter reportTriggerSize-ForDCIFormat0_2, respectively. In a case that the RRC parameter reportTriggerSize or the RRC parameter reportTriggerSize-ForDCIFormat0_2 indicates the integer value (e.g. N_TS1 or N_TS2) as 0, the CSI request field is absent in the corresponding DCI format. If the CSI request field is absent in a DCI format, the base station 160 cannot request the UE 102 to trigger an aperiodic CSI reporting or to perform an aperiodic CSI reporting via the DCI format.

If the CSI request field is present in a DCI format, the base station 160 may indicate the UE 102 to initiate a trigger state by using the CSI request field in the DCI format. According to the size N_TS of the CSI request field, the CSI request field value is in a range of $\{0, 1, 2, \ldots, 2^{N\_TS}-1\}$. For DCI format 0_1, NTS refers to N_TS1. For DCI format 0_2, N_TS refers to N_TS2. When the CSI request field value is zero, there is no aperiodic CSI report to be triggered and the UE 102 may not trigger an aperiodic CSI reporting. That is, when all the bits of the CSI request field in DCI format are set to zero, the UE 102 may not trigger an aperiodic CSI reporting. A zero codepoint of the CSI request field in the DCI format may not request the UE 102 to trigger an aperiodic CSI reporting. In other words, the non-zero codepoint of the CSI request field (the non-zero CSI request field value) in the DCI format can be used to indicate a triggering state in a list of trigger states. For DCI format 0_1, up to $2^{N\_TS1}-1$ trigger states can be indicated, while for DCI format 0_2 up to $2^{N\_TS2}-1$ trigger states can be indicated.

In a case that the number of CSI trigger state in (provided by) the CSI-AperiodicTriggerStateList is less than or equal to $2^{N\_TS1}-1$, the CSI request field of DCI format 0_1 can provide an one to one mapping between the non-zero CSI request field value and the trigger state in the CSI-AperiodicTriggerStateList. In this case, the CSI request field of the DCI format 0_1 can directly indicate the trigger state in the list of trigger states provided by the CSI-AperiodicTriggerStateList. As same with DCI format 0_1, in a case that the number of CSI trigger state in (provided by) the CST AperiodicTriggerStateList-ForDCIFormat0_2 is less than or equal to $2^{N\_TS2}-1$, the CSI request field of DCI format 0_2 can provide an one to one mapping between the non-zero CSI request field value and the trigger state in the CSI-AperiodicTriggerStateList-ForDCIFormat0_2. That is, in this case, the CSI request field of the DCI format 0_2 can also directly indicate the trigger state in the list of trigger states provided by the CSI-AperiodicTriggerStateList-ForDCIFormat0_2. For example, codepoint value 1 (CSI request field value 1, codepoint '1') map to the first trigger state in the list of trigger states, codepoint value 2 (CSI request field value 2, codepoint '2') map to the second trigger state in the list of trigger states and so on.

However, the total number of configuring trigger state within a list of the trigger states can be greater than the $2^{N\_TS}-1$. In this case, the CSI request field cannot directly indicate the trigger state within the list of trigger states. In this case, the base station 160 may select one or more trigger states out of the configured aperiodic CSI trigger states for the UE 102. The base station 160 may select among the configured aperiodic CSI trigger states of a Serving Cell by sending the Aperiodic CSI Trigger State Subselection MAC Control Element (MAC CE) to the UE 102. That is, the base station 160 may transmit, to the UE 102, an aperiodic CSI trigger state subselection MAC CE to indicate the selected one or more configured trigger states of a serving cell. The aperiodic CSI trigger state subselection MAC CE can also be regarded as a subselection indication. In other words, the aperiodic CSI trigger state subselection MAC CE is used to select one or more trigger states out of the list of trigger states. The selected trigger states can be mapped to the codepoints of the CSI request field. The trigger states other than the selected trigger states in the list cannot be mapped to the codepoints of the CSI request field. That is, the aperiodic CSI trigger state subselection MAC CE is used to map one or more trigger states in the list to the codepoints of the CSI request field. Each codepoint of the CSI request field maybe associated with one selected trigger state. The selected trigger state can be also regarded as the activating trigger states which are activated by the base station 160 via the aperiodic CSI trigger state subselection MAC CE.

FIG. 2 illustrates one example 200 of aperiodic CSI trigger state subselection MAC CE.

The aperiodic CSI trigger state subselection MAC CE 200 can be identified by a MAC subheader with a logical channel ID (LCID). There is one LCID field per MAC subheader. The aperiodic CSI trigger state subselection MAC CE corresponds to a predefined LCID value. The length of LCID field is 6 bits.

The size of the subselection MAC CE 200 is a variable size consisting of fields such as serving cell ID, BWP ID, $T_i$, R (Reserved bit). The Serving Cell ID field indicates the identity of the Serving Cell for which the MAC CE applies. The length of the field is 5 bits. This BWP ID field indicates a DL BWP for which the MAC CE applies. The length of the BWP ID field is 2 bits. The $T_i$ field indicates the selection status of the Aperiodic Trigger States configured within CSI-aperiodicTriggerStateList (or CSI-aperiodicTriggerStateList—ForDCIFormat0_2). To refers to the first trigger state within the list, $T_i$ to the second one and so on. If the list does not contain entry with index i, the MAC entity of the UE 102 may ignore the $T_i$ field. The $T_i$ field is set to 1 to indicate that the Aperiodic Trigger State i shall be mapped to the codepoint of the DCI CSI request field. In other words, the $T_i$ field being set to 1 may indicate that the ith trigger state within the list is an activating aperiodic trigger state. The codepoint to which the Aperiodic Trigger State is mapped is determined by its ordinal position among all the Aperiodic Trigger States with $T_i$ field set to 1, i.e. the first Aperiodic Trigger State with $T_i$ field set to 1 shall be mapped to the codepoint value 1, second Aperiodic Trigger State with $T_i$ field set to 1 shall be mapped to the codepoint value 2 and so on. The maximum number of mapped Aperiodic Trigger States is 63. The R field of 1 bit may be set to 0.

As above-mentioned, the aperiodic CSI trigger state subselection MAC CE can be used to select trigger states out of a list of trigger state when the total number of the trigger states of the list is greater than $2^{N\_TS}-1$. The selected trigger states can be up to $2^{N\_TS}-1$, which are mapped to the codepoints of the CSI request field of a DCI format. However, for a wireless communication system where one or more than one DCI formats can be simultaneously configured to a UE to trigger an aperiodic CSI report, the existing mechanism that an aperiodic CSI trigger state subselection MAC CE is configured and applied to DCI format 0_1 may not adapt to this kind of system. To improve the efficiency of the aperiodic CSI report, some designs are illustrated below.

In an embodiment A of the present discourse, two aperiodic CSI trigger state subselection MAC CEs are utilized.

One aperiodic CSI trigger state subselection MAC CE with a predefined LCID value A is applied to (associated with) DCI format 0_1. The other aperiodic CSI trigger state subselection MAC CE with a predefined LCID value B is applied to (associated with) DCI format 0_2. The predefined LCID value A is different from the predefined LCID value B.

Figure 3:
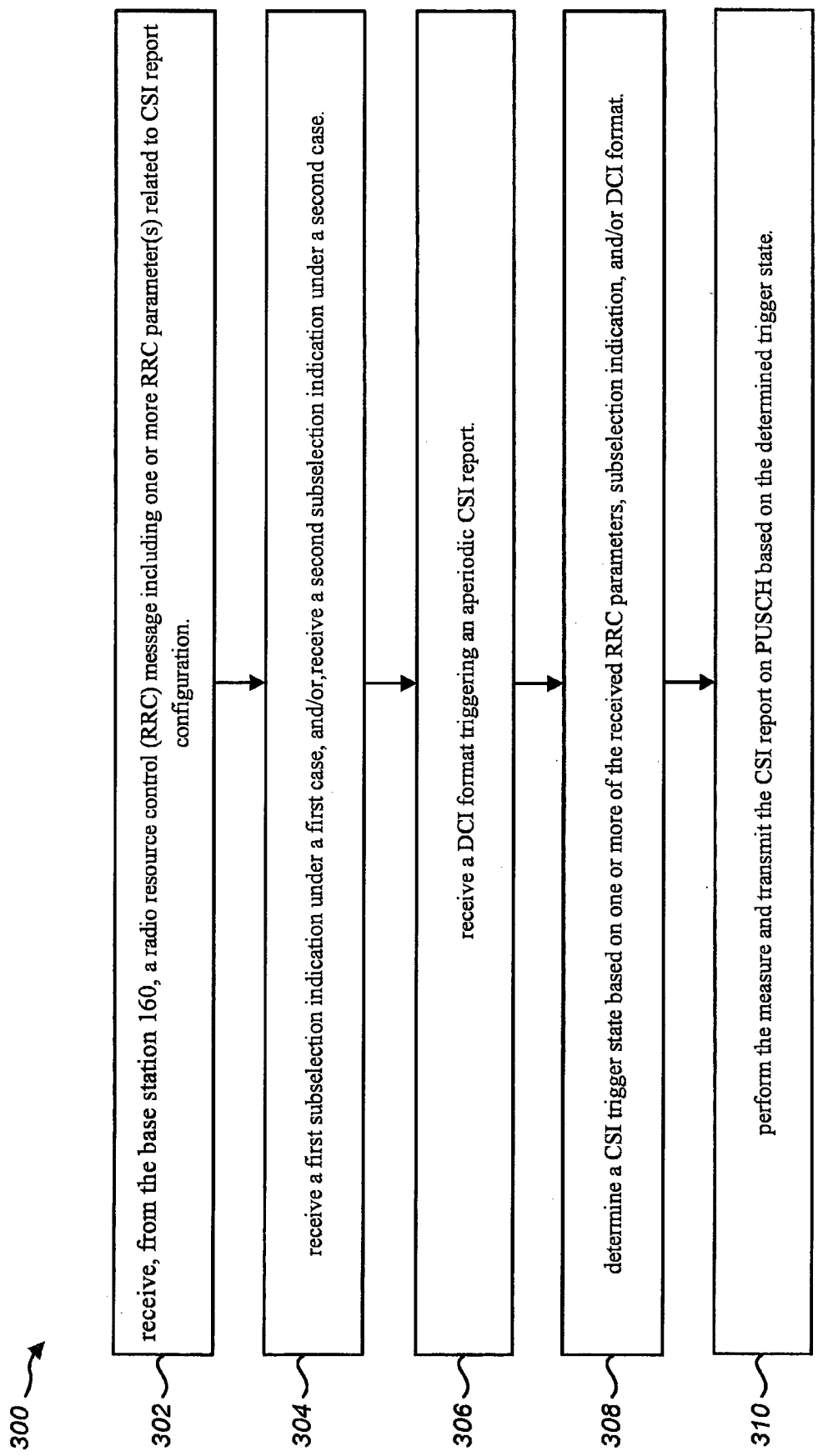
FIG. 3 is a flow a flow diagram illustrating one implementation of a method 300 for determining an aperiodic trigger state by a UE 102.

FIG. 3 is a flow diagram illustrating one implementation of a method 300 for determining an aperiodic trigger state by a UE 102.

The UE 102 may receive 302, from the base station 160, a RRC message including one or more RRC parameter(s) related to CSI report configuration (or aperiodic CSI trigger states configuration). For example, the UE 102 may receive 302 a first RRC parameter CSI-aperiodicTriggerStateList including (indicating, or providing) a first list of one or more CSI trigger states. The CSI trigger states within the first list is associated with or applied to a first DCI format. The UE may receive a second RRC parameter reportTriggerSize indicating a first total number of bits N_TS1 for a first CSI request field of the first DCI format. The UE 102 may also receive a RRC parameter CSI-aperiodicTriggerStateList—ForDCIFormat0_2 including a second list of one or more CSI trigger states. The CSI trigger states within the second list is associated with or applied to a second DCI format. The UE may receive a fourth RRC parameter reportTriggerSize-ForDCIFormat0_2 indicating a second total number of bits N_TS2 for a second CSI request field of the second DCI format. The term 'the CSI trigger states within the first list is associated with or applied to a first DCI format' herein may imply that the CSI request field in the first DCI format indicates a trigger state among the trigger states within the first list. In other words, the first CSI request field in the first DCI format may not indicate a trigger state within a second list. The second CSI request field in the second DCI format may indicate a trigger state among the trigger states within the second list, while the second CSI request field in the second DCI format may not indicate a trigger state within the first list.

At 304, in a first case that a total number of the one or more CSI trigger states within the first list is greater than $2^{N\_TS1}-1$, the UE 102 maybe further configured to select one or more of the CSI trigger states out of the first list. The selected one or more of the CSI trigger states may be mapped to one or more codepoints of the first CSI request field of the first DCI format. The selected one or more of the CSI trigger states out of the first list can be up to $2^{N\_TS1}-1$ CSI trigger states. The one or more of the CSI trigger states out of the first list may be selected based on a first MAC CE (or a first Aperiodic CSI Trigger States Subselection MAC CE, or a first subselection indication). That is, the UE 102 may further receive the first MAC CE identified by a first predefined LCID value. For example, the first predefined Lap value can be predetermined as 54. The base station 160 may select up to $2^{N\_TS1}-1$ trigger state among the aperiodic CSI trigger states of a Serving Cell configured by the RRC parameter CSI-aperiodicTriggerStateList by sending the first subselection indication. If the MAC entity of the UE 102 receives the first subselection indication on a Serving Cell, the MAC entity of the UE 102 indicates to lower layers (e.g. physical layers) the information regarding the first subselection indication. The UE 102 (or the physical layers of the UE 102) may use the first subselection indication to map up to $2^{N\_TS1}-1$ selected trigger states to the codepoints of the first CSI request field in the first DCI format. The size of the first subselection indication (the Octets number N as shown in the FIG. 2) is determined based on the total number of the one or more CSI trigger states within the first list.

At 304, in a second case that the total number of the one or more CSI trigger states in the second list is greater than $2^{N\_TS2}-1$, the UE 102 maybe further configured to select one or more of the CSI trigger states out of the second list. The selected one or more of the CSI triggered states may be mapped to one or more codepoints of the second CSI request field of the second DCI format. The selected one or more of the CSI trigger states out of the second list can be up to $2^{N\_TS2}-1$ CSI trigger states. The one or more of the CSI trigger states out of the second list may be selected based on a second MAC CE (or a second Aperiodic CSI Trigger States Subselection MAC CE, or a second subselection indication). That is, the UE 102 may further receive the second MAC CE identified by a second predefined LCID value. For example, the second predefined LCID value may be different from the first predefined LCID value. The base station 160 may select (or indicate) up to $2^{N\_TS2}-1$ trigger state among the aperiodic CSI trigger states of a Serving Cell configured by the RRC parameter CST aperiodicTriggerStateList-ForDCIFormat0_2 by sending the second subselection indication. If the MAC entity of the UE 102 receives a second subselection indication on a Serving Cell, the MAC entity of the UE 102 indicates to lower layers (e.g. physical layers) the information regarding the second subselection indication. The UE 102 (or the physical layers of the UE 102) may use the second subselection indication to map up to $2^{N\_TS1}-1$ selected trigger states to the codepoints of the second CSI request field in the second DCI format. The size of the second subselection indication (the Octets number N as shown in the FIG. 2) is determined based on the total number of the one or more CSI trigger states within the second list.

As above-mentioned, at 304, the UE 102 may further receive, from the base station 160, a first subselection indication under a first case. At 304, the UE 102 may further receive, from the base station 160, a second subselection indication under a second case. At 304, the UE 102 may not receive the first subselection indication if the total number of the one or more CSI trigger states within the first list is greater than $2^{N\_TS1}-1$. Accordingly, the UE 102 may not receive the second subselection indication if the total number of the one or more CSI trigger states within the second list is greater than $2^{N\_TS2}-1$.

At 306, the UE 102 may receive a DCI format including a CSI request field. If the CSI request field value is set to 0, not CSI report is requested by the base station 160. If the CSI request field value is set to non-zero, a CSI report is requested by the base station 160. In response to the aperiodic CSI report request, the UE 102 may need to determine a CSI trigger state which is associated with one or more CSI report configuration (setting) CSI-ReportConfig.

At 308, the UE 102 may determine a CSI trigger state in response to the non-zero CSI request field value of a DCI format. The UE 102 may, based on one or more of the received RRC parameters, MAC CE (or subselection indication), and/or the DCI format, determine a CSI trigger state.

In an example, if the UE 102 receive a non-zero CSI request field value of the first DCI format, and if the total number of the one or more CSI trigger states within the first list is less than or equal to $2^{N\_TS1}-1$, the UE 102 may determine the CSI trigger state based on the received first list and the non-zero CSI request field value of the first DCI format. The non-zero CSI request field value indicates the position of the determined trigger state within the first list.

In an example, if the UE 102 receive a non-zero CSI request field value of the second DCI format, and if the total number of the one or more CSI trigger states within the second list is less than or equal to $2^{N\_TS2}-1$, the UE 102 may determine the trigger state based on the received second list and the non-zero CSI request field value of the second DCI format: The non-zero CSI request field value indicates the position of the determined trigger state within the second list.

In an example, if the UE 102 receive a non-zero CSI request field value of the first DCI format, and if the total number of the one or more CSI trigger states within the first list is greater than $2^{N\_TS1}-1$, the UE 102 may determine the trigger state based on the received first list, the received first subselection indication, and the non-zero CSI request field value of the first DCI format.

In an example, if the UE 102 receive a non-zero CSI request field value of the second DCI format, and if the total number of the one or more CSI trigger states within the second list is greater than $2^{N\_TS2}-1$, the UE 102 may determine the trigger state based on the received second list, the received second subselection indication, and the non-zero CSI request field value of the second DCI format.

At 310, the UE 102 may, based on the determined CSI trigger state, perform the CSI measurement on CSI-RS or SSB/PBCH block. The UE 102 may estimate or calculate the downlink channel state based on the measurements and feed the estimated channel state back to the base station 160. The UE 102 may transmit the resulted CSI report by using PUSCH in a certain time-domain resource.

Figure 4:
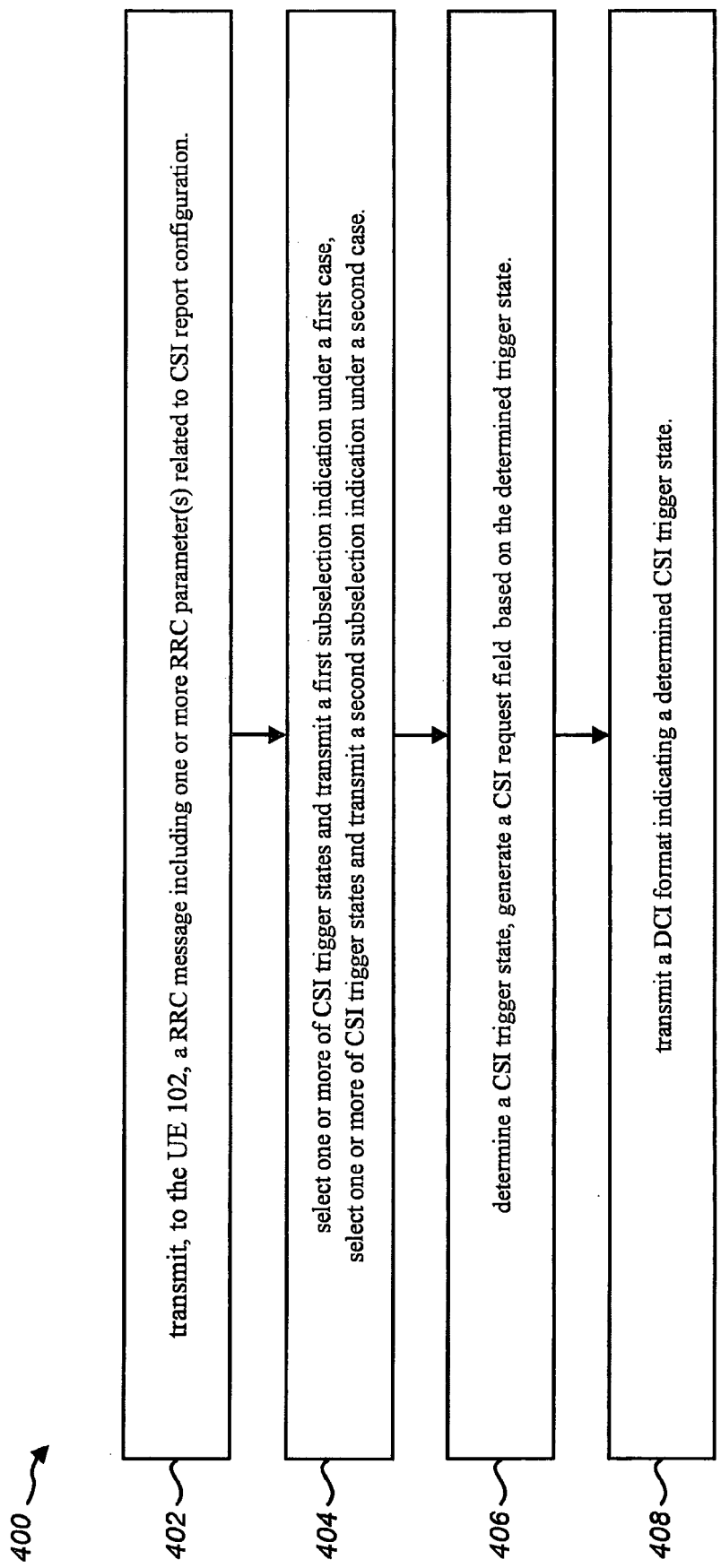
FIG. 4 is a flow a flow diagram illustrating one implementation of a method 400 for determining an aperiodic trigger state by a base station 160.

FIG. 4 is a flow diagram illustrating one implementation of a method 400 for determining an aperiodic trigger state by a base station 160.

The base station 160 may determine 402 a RRC parameter including one or more RRC parameters related to CSI report configuration for a UE 102. For example, the base station 160 may transmit 402, to a UE 102, a first RRC parameter CSI-aperiodicTriggerStateList including (indicating, or providing) a first list of one or more CSI trigger states. The CSI trigger states within the first list is associated with or applied to a first DCI format. The base station 160 may transmit, to the UE 102, a second RRC parameter reportTriggerSize indicating a first total number of bits N_TS1 for a first CSI request field of the first DCI format. The base station 160 may also transmit, to the UE 102, a RRC parameter CSI-aperiodicTriggerStateList—ForDCIFormat0_2 including a second list of one or more CSI trigger states. The CSI trigger states within the second list is associated with or applied to a second DCI format. The base station may transmit, to the UE 102, a fourth RRC parameter reportTriggerSize-ForDCIFormat0_2 indicating a second total number of bits N_TS2 for a second CSI request field of the second DCI format.

At 404, in a first case that a total number of the one or more CSI trigger states within the first list is greater than $2^{N\_TS1}-1$, the base station 160 may further select one or more of the CSI trigger states out of the first list. The base station 160 may indicate, to the UE 102, the selected one or more of the CSI trigger states by transmitting a first MAC CE to the UE 102. The selected one or more of the CSI trigger states may be mapped to one or more codepoints of the first CSI request field of the first DCI format.

At 404, in a second case that a total number of the one or more CSI trigger states within the second list is greater than $2^{N\_TS2}-1$, the base station 160 may further select one or more of the CSI trigger states out of the second list. The base station 160 may indicate, to the UE 102, the selected one or more of the CSI trigger states by transmitting a second MAC CE to the UE 102. The selected one or more of the CSI trigger states may be mapped to one or more codepoints of the second CSI request field of the second DCI format.

At 406, if the base station 160 plans to request the UE 102 to trigger an aperiodic CSI report according to a CSI trigger state configured in the first list, the base station 160 may determine a CSI trigger state from the first list. Then the base station may generate a first CSI request field with a non-zero value for the first DCI format based on the determined CSI trigger state. At 408, the base station may transmit, to the UE 102, the first DCI format with the first CSI request field indicating the determined CSI trigger state. If the base station 160 does not request the UE 102 for a CSI report, the base station 160 may generate a first CSI request field with a zero value.

At 406, if the base station 160 plans to request the UE 102 to trigger an aperiodic CSI report according to a CSI trigger state configured in the second list, the base station 160 may determine a CSI trigger state from the second list. Then the base station may generate a second CSI request field with a non-zero value for the second DCI format based on the determined CSI trigger state. At 408, the base station may transmit, to the UE 102, the second DCI format with the second CSI request field indicating the determined CSI trigger state. If the base station 160 does not request the UE 102 for a CSI report, the base station 160 may generate a first CSI request field with a zero value.

In another embodiment B of the present disclosure, one aperiodic CSI trigger state subselection MAC CEs is utilized. One aperiodic CSI trigger state subselection MAC CE may be applied to (associated with) DCI format 0_1 and/or DCI format 0_2. The procedures described in the embodiment A assume that two aperiodic CSI trigger state subselection MAC CEs may be utilized to determine the CSI trigger state, but the procedures in the embodiment A can also equally apply to that in the embodiment B by redefining (reinterpreting) the first MAC CE (the first subselection indication) and the second MAC CE (the second subselection indication) in the embodiment A.

In embodiment B, the UE 102 may receive, from the base station 160, a third MAC CE identified by a third LCID value. As mentioned above, an existing MAC CE 200 consists of 1-bit 'reserved bit R' field. Thus the third MAC CE may consist of the one bit field. In embodiment B, the one bit field in the third MAC CE can be used to indicate the third MAC CE is applied to select the CSI trigger states out of the first list or out of the second list. For example, the third MAC CE consisting of a 1-bit field being set to 0 may correspond to the first MAC CE in the embodiment A. The third MAC CE consisting of a 1-bit field being set to 1 may correspond to the second MAC CE in the embodiment A. The third LCID value may be same with the first LCID value. Therefore, the procedures in the embodiment A can also equally apply to that in the embodiment B according to the corresponding association.

In embodiment A, the one or more of the CSI trigger states out of the first list may be selected based on the first MAC CE identified by a first LCID value in a first case, while the one or more of the CSI trigger states out of the second list may be selected based on the second MAC CE identified by a second LCID value in a second case. On the other hand, in embodiment B, the one or more of the CSI trigger states out of the first list may be selected based on the third MAC CE consisting of a 1-bit field being set to 0 in a first case, while the one or more of the CSI trigger states out of the second list may be selected based on the third MAC CE consisting of a 1-bit field being set to 1 in a second case.

That is, in embodiment B, at 304, the UE 102 may further receive, from the base station 160, a third MAC CE consisting of a 1-bit field being set to 0 under a first case. At 304, the UE 102 may further receive, from the base station 160, a third MAC CE consisting of a 1-bit field being set to 1 under a second case. At 304, the UE 102 may not receive a third MAC CE consisting of a 1-bit field being set to 0 if the total number of the one or more CSI trigger states within the first list is greater than $2^{N\_TS1}-1$. Accordingly, the UE 102 may not receive a third MAC CE consisting of a 1-bit field being set to 1 if the total number of the one or more CSI trigger states within the second list is greater than $2^{N\_TS2}-1$.

The size of the third MAC CE (e.g. the Octets number N as shown in the FIG. 2) may be determined based on a larger number between a total number of the one or more CSI trigger states within the first list and a total number of the one or more CSI trigger states within the second list.

Additionally or alternatively, the size of the third MAC CE consisting of a 1-bit field being set to 0 may be determined based on a total number of the one or more CSI trigger states within the first list. The size of the third MAC CE consisting of a 1-bit field being set to 1 may be determined based on a total number of the one or more CSI trigger states within the second list.

In another embodiment C of the present disclosure, one aperiodic CSI trigger state subselection MAC CEs is utilized. One aperiodic CSI trigger state subselection MAC CE may be applied to (associated with) DCI format 0_1 and/or DCI format 0_2.

In embodiment C, the UE 102 may receive, form the base station 160, a fourth MAC CE identified by a fourth LCID value. The fourth LCID value may be same with the first LCID value in embodiment A. One or more of the CSI trigger states out of the first list and/or the one or more of the CSI trigger states out of the second list may be selected based on the fourth MAC CE.

In a case that, (i) a total number of the one or more CSI trigger states within the first list is greater than $2^{N\_TS1}-1$, and (ii) a total number of the one or more CSI trigger states within the second list is equal to or less than $2^{N\_TS2}-1$, the UE 102 may receive the fourth MAC CE. The one or more of the CSI trigger states out of the first list may be selected based on the fourth MAC CE. The size of the fourth MAC CE may be determined based on the total number of the one or more CSI trigger states within the first list. That is, $T_i$ fields may refer to the one or more CSI trigger states within the first list.

In a case that, (i) a total number of the one or more CSI trigger states within the first list is equal to or less than $2^{N\_TS1}-1$, and (ii) a total number of the one or more CSI trigger states within the second list is greater than $2^{N\_TS2}-1$, the UE 102 may receive the fourth MAC CE. The one or more of the CSI trigger states out of the second list may be selected based on the fourth MAC CE. The size of the fourth MAC CE may be determined based on the total number of the one or more CSI trigger states within the second list. That is, $T_i$ fields may refer to the one or more CSI trigger states within the second list.

Figure 5:
FIG. 5 illustrates one example 500 of aperiodic CSI trigger state subselection MAC CE.

In a case that, (i) a total number of the one or more CSI trigger states within the first list is greater than $2^{N\_TS1}-1$, and (ii) a total number of the one or more CSI trigger states within the second list is greater than $2^{N\_TS2}-1$, the UE 102 may receive the fourth MAC CE. Both the one or more of the CSI trigger states out of the first list and the one or more of the CSI trigger states out of the second list may be selected based on the fourth MAC CE. The size of the fourth MAC CE may be determined based on the summation of the total number of the one or more CSI trigger states within the first list and the total number of the one or more CSI trigger states within the second list. That is, a part of $T_i$ fields may refer to the one or more CSI trigger states within the first list. Another (the other, the remaining) part of $T_i$ fields may refer to the one or more CSI trigger states within the second list. The fourth MAC CE may indicate both the one or more CSI trigger states within the first list and the one or more CSI trigger states within the second list. FIG. 5 illustrates one example 500 of aperiodic CSI trigger state subselection MAC CE. The aperiodic CSI trigger state subselection MAC CE (fourth MAC CE) 500 indicates both the one or more CSI trigger states within the first list and the one or more CSI trigger states within the second list.

The size of the subselection MAC CE 200 (the Octets number M) is a variable size consisting of fields such as serving cell ID, BWP ID, $T_i$, R (Reserved bit) and is determined bases on the summation of the total number of the one or more CSI trigger states within the first list and the total number of the one or more CSI trigger states within the second list. The Serving Cell ID field indicates the identity of the Serving Cell for which the MAC CE applies. The length of the field is 5 bits. This BWP ID field indicates a DL BWP for which the MAC CE applies. The length of the BWP ID field is 2 bits. The $T_i$ fields located from Octet 2 to Octet N refer to the CSI trigger state within the first list. That is, the $T_0$ refers to the first CSI trigger state within the first list, $T_1$ to the second one within the first list and so on. The $T_i$ field located from Octet 2 to Octet N is set to 1 to indicate that the ith CSI trigger State within the first list shall be mapped to the codepoint of the first CSI request field of the first DCI format. The $T_i$ fields located from Octet N+1 to Octet M refer to the CSI trigger state within the second list. That is, the $T_{(N-1)*8}$ refers to the first CSI trigger state within the second list, $T_{(N-1)*8+1}$ to the second one within the second list and so on. The $T_i$ field located from Octet N+1 to Octet M is set to 1 to indicate that the (i-(N-1)*8)th CSI trigger State within the second list shall be mapped to the codepoint of the second CSI request field of the second DCI format.

In another embodiment D of the present disclosure, one aperiodic CSI trigger state subselection MAC CEs is utilized. One aperiodic CSI trigger state subselection MAC CE (e.g. the fifth MAC CE) may be applied to (associated with) DCI format 0_1 and/or DCI format 0_2. The UE 102 may receive, from the base station 160, a RRC message including one or more RRC parameter(s) related to CSI report configuration. For example, the UE 102 may receive a first RRC parameter CST aperiodicTriggerStateList including a first list of one or more CSI trigger states. The UE may receive a second RRC parameter reportTriggerSize indicating a first total number of bits N_TS1 for a first CSI request field of the first DCI format (e.g. the DCI format 0_2). The UE 102 may also receive a RRC parameter CSI-aperiodicTriggerStateList—ForDCIFormat0_2 including a second list of one or more CSI trigger states. The UE may receive a fourth RRC parameter reportTriggerSize-ForDCIFormat0_2 indicating a second total number of bits N_TS2 for a second CSI request field of the second DCI format (e.g. the DCI format 0_2).

In an example A of embodiment D, the UE may further receive a fifth MAC CE identified by a fifth LCID value. The fifth LCID value may be same with the first LCID value. The fifth MAC CE may be applied to the first DCI format and the fifth MAC CE may not be applied to the second DCI format. In other words, the total number of the one or more CSI trigger states within the first list may be configured to be greater than, equal to, or less than the $2^{N\_TS1}-1$. Then in a case that the total number of the one or more CSI trigger states within the first list is greater than the $2^{N\_TS1}-1$, the UE 102 may further receive the fifth MAC CE to select one or more of the CSI trigger states out of the first list. That is, the one or more of the CSI trigger states out of the first list may be selected based on a first MAC CE. The UE 102 may determine, based on one or more of the first RRC parameter, the second RRC parameter, the first CSI request field, and the fifth MAC CE, a CSI trigger state in response to the first CSI request field of the first DCI format.

On the other hand, in the example A, the total number of the one or more CSI trigger states within the second list may be configured to be equal to, or less than the $2^{N\_TS2}-1$. The total number of the one or more CSI trigger states within the second list. Given the restriction, the second CSI request field of the second DCI format may directly indicate the CSI trigger state. The UE 102 may determine, based on one or more of the third RRC parameter, the fourth RRC parameter, and the second CSI request field, a CSI trigger state in response to the second CSI request field of the second DCI format.

According to the example A, regardless of whether the total number of the one or more CSI trigger states within the first list is greater than the $2^{N\_TS1}-1$ or not, the fifth MAC CE is not applied to the second DCI format.

In an example B of embodiment D, the UE may further receive a fifth MAC CE identified by a fifth LCID value. The fifth LCID value may be same with the first LCID value. The fifth MAC CE may be applied to the first DCI format. The fifth MAC CE may be also applied to the second DCI format in some specific cases.

For example, the specific cases may be a case where the UE is not configured to monitor the first DCI format. The specific cases may be a case where the UE is configured to monitor the first DCI format but the CSI request field is configured to be absent. The specific cases may be a case where the UE is configured to monitor the first DCI format and the total number of the one or more CSI trigger states within the first list is less than or equal to $2^{N\_TS1}-1$. In the specific case and if a total number of the one or more CSI trigger states within the second list is greater than $2^{N\_TS2}-1$, the UE 102 may further receive the fifth MAC CE to select one or more of the CSI trigger states out of the second list which are mapped to one or more codepoints of the second CSI request field of the second DCI format.

In the example B, in a case that a total number of the one or more CSI trigger states within the first list is greater than $2^{N\_TS1}-1$, the UE 102 may receive the fifth MAC CE. The one or more of the CSI trigger states out of the first list may be selected based on the fifth MAC CE. The size of the fifth MAC CE may be determined based on the total number of the one or more CSI trigger states within the first list. That is, $T_i$ fields may refer to the one or more CSI trigger states within the first list. In this case, a total number of the one or more CSI trigger states within the second list may not be configured to greater than the $2^{N\_TS2}-1$.

In the example B, in a case that a total number of the one or more CSI trigger states within the first list is equal to or less than $2^{N\_TS1}-1$, a total number of the one or more CSI trigger states within the second list may be configured to greater than the $2^{N\_TS2}-1$. That is, in a case that a total number of the one or more CSI trigger states within the first list is equal to or less than $2^{N\_TS1}-1$, the UE 102 may receive the fifth MAC CE if a total number of the one or more CSI trigger states within the second list is greater than $2^{N\_TS2}-1$. The one or more of the CSI trigger states out of the second list may be selected based on the fifth MAC CE. The size of the fifth MAC CE may be determined based on the total number of the one or more CSI trigger states within the second list. $T_i$ fields of the fifth MAC CE may refer to the one or more CSI trigger states within the second list. The base station 160 may not simultaneously configure, to the UE 102, that (I) a total number of the one or more CSI trigger states within the first list is greater than $2^{N\_TS1}-1$ and (II) a total number of the one or more CSI trigger states within the second list is greater than the $2^{N\_TS2}-1$.

Figure 6:
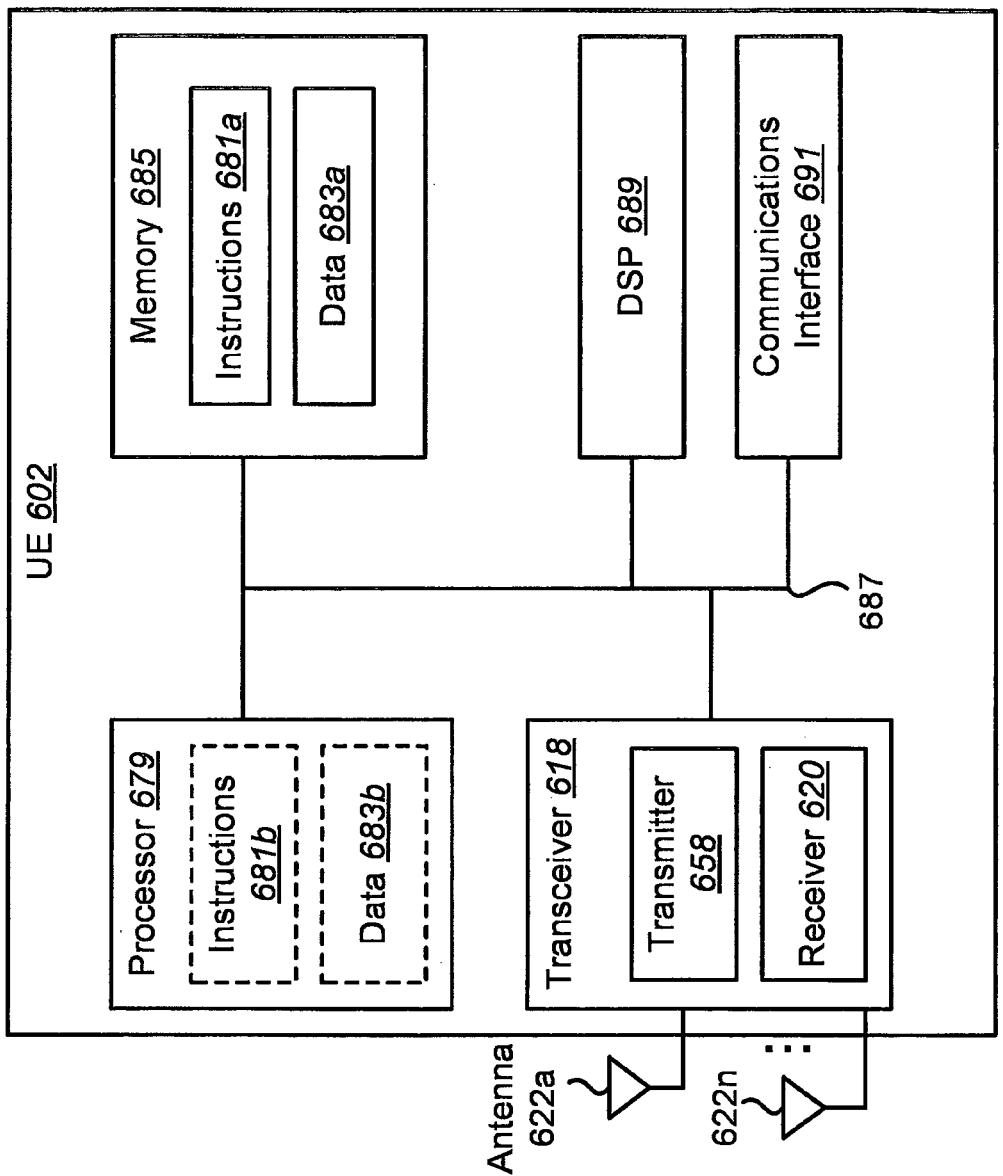
FIG. 6 illustrates various components that may be utilized in a UE.

FIG. 6 illustrates various components that may be utilized in a UE 602. The UE 602 described in connection with FIG. 6 may be implemented in accordance with the UE 102 described in connection with FIG. 1. The UE 602 includes a processor 681 that controls operation of the UE 602. The processor 681 may also be referred to as a central processing unit (CPU). Memory 687, which may include read-only memory (ROM), random access memory (RAM), a combination of the two or any type of device that may store information, provides instructions 683*a* and data 685*a* to the processor 681. A portion of the memory 687 may also include non-volatile random access memory (NVRAM). Instructions 683*b* and data 685*b* may also reside in the processor 681. Instructions 683*b* and/or data 685*b* loaded into the processor 681 may also include instructions 683*a* and/or data 685*a* from memory 687 that were loaded for execution or processing by the processor 681. The instructions 683*b* may be executed by the processor 681 to implement one or more of the methods 200 described above.

The UE 602 may also include a housing that contains one or more transmitters 658 and one or more receivers 620 to allow transmission and reception of data. The transmitter(s) 658 and receiver(s) 620 may be combined into one or more transceivers 618. One or more antennas 622*a-n* are attached to the housing and electrically coupled to the transceiver 618.

The various components of the UE 602 are coupled together by a bus system 689, which may include a power bus, a control signal bus and a status signal bus, in addition to a data bus. However, for the sake of clarity, the various buses are illustrated in FIG. 6 as the bus system 689. The UE 602 may also include a digital signal processor (DSP) 691 for use in processing signals. The UE 602 may also include a communications interface 693 that provides user access to the functions of the UE 602. The UE 602 illustrated in FIG. 6 is a functional block diagram rather than a listing of specific components.

Figure 7:
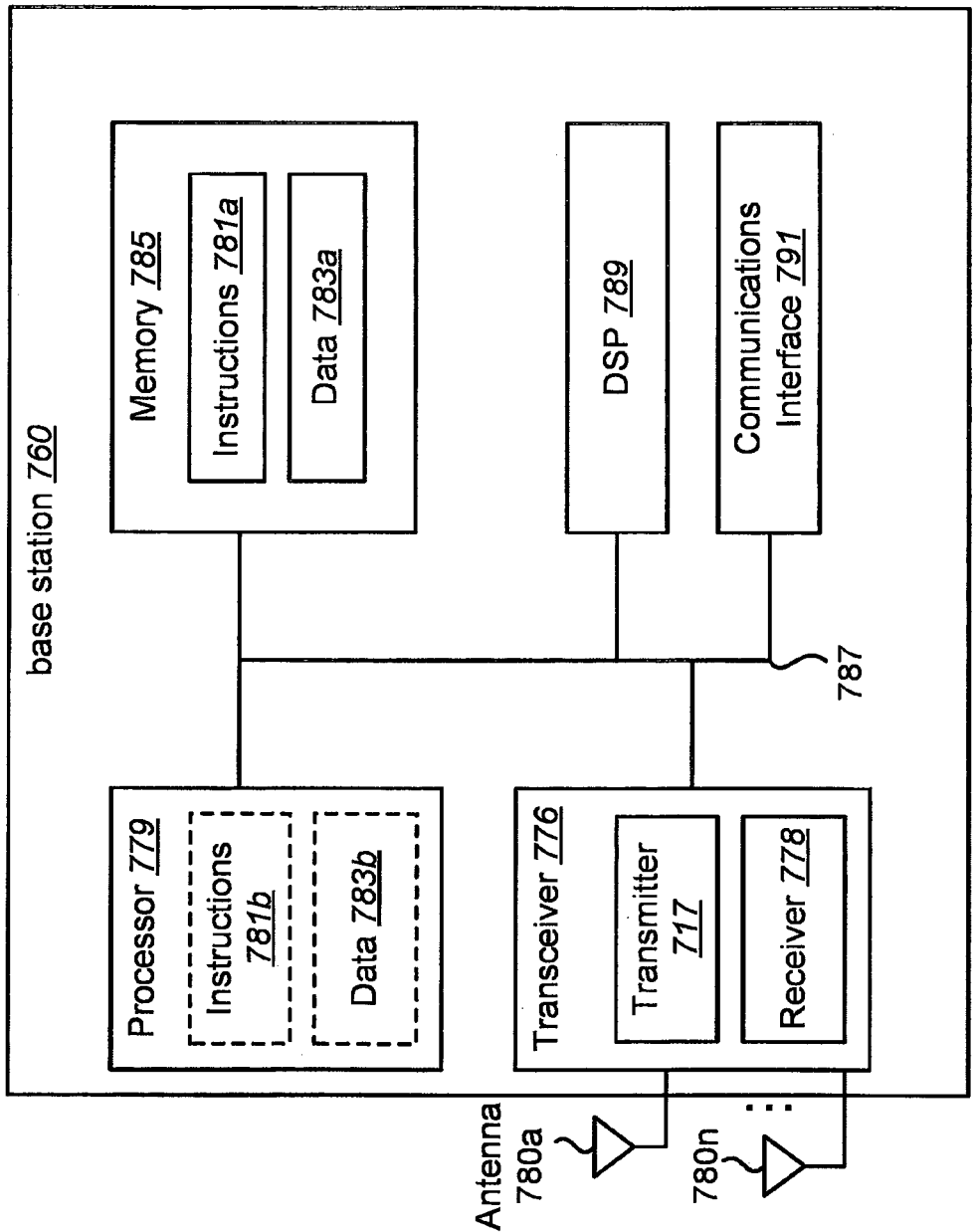
FIG. 7 illustrates various components that may be utilized in a base station.

FIG. 7 illustrates various components that may be utilized in a base station 760. The base station 760 described in connection with FIG. 7 may be implemented in accordance with the base station 160 described in connection with FIG. 1. The base station 760 includes a processor 781 that controls operation of the base station 760. The processor 781 may also be referred to as a central processing unit (CPU). Memory 787, which may include read-only memory (ROM), random access memory (RAM), a combination of the two or any type of device that may store information, provides instructions 783*a* and data 785*a* to the processor 781. A portion of the memory 787 may also include non-volatile random access memory (NVRAM). Instructions 783*b* and data 785*b* may also reside in the processor 781. Instructions 783*b* and/or data 785*b* loaded into the processor 781 may also include instructions 783*a* and/or data 785*a* from memory 787 that were loaded for execution or processing by the processor 781. The instructions 783*b* may be executed by the processor 781 to implement one or more of the methods 300 described above.

The base station 760 may also include a housing that contains one or more transmitters 717 and one or more receivers 778 to allow transmission and reception of data. The transmitter(s) 717 and receiver(s) 778 may be combined into one or more transceivers 776. One or more antennas 780a-n are attached to the housing and electrically coupled to the transceiver 776.

The various components of the base station 760 are coupled together by a bus system 789, which may include a power bus, a control signal bus and a status signal bus, in addition to a data bus. However, for the sake of clarity, the various buses are illustrated in FIG. 7 as the bus system 789. The base station 760 may also include a digital signal processor (DSP) 791 for use in processing signals. The base station 760 may also include a communications interface 793 that provides user access to the functions of the base station 760. The base station 760 illustrated in FIG. 7 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:
reception circuitry configured to receive, from a base station, a first radio resource control (RRC) parameter including a first list of one or more channel state information (CSI) trigger states, a second RRC parameter indicating a first total number of bits N_TS1 for a first CSI request field of a first downlink control information (DCI) format, a third RRC parameter including a second list of one or more CSI trigger states, and a fourth RRC parameter indicating a second total number of bits N_TS2 for a second CSI request field of a second DCI format; and
processing circuitry configured to determine a CSI trigger state in response to a CSI request field of a DCI format, wherein:
the reception circuitry is further configured to receive a medium access control (MAC) control element (CE),
in a first case that a total number of the one or more CSI trigger states within the first list is greater than $2^{N\_TS1}-1$, the processing circuitry is further configured to select at least one of the one or more CSI trigger states out of the first list which is mapped to one or more codepoints of the first CSI request field of the first DCI format, and the at least one of the one or more CSI trigger states out of the first list is selected based on the MAC CE including a 1-bit field being set to 0, and
in a second case that a total number of the one or more CSI trigger states within the second list is greater than $2^{N\_TS2}-1$, the processing circuitry is further configured to select at least one of the one or more CSI trigger states out of the second list which is mapped to one or more codepoints of the second CSI request field of the second DCI format, and the at least one of the one or more CSI trigger states out of the second list is selected based on the MAC CE including the 1-bit field being set to 1.

2. The UE according to claim 1, wherein:
a total number of the at least one of the one or more CSI trigger states out of the first list is up to $2^{N\_TS1}-1$ CSI trigger states, and
a total number of the at least one of the one or more CSI trigger states out of the second list is up to $2^{N\_TS2}-1$ CSI trigger states.

3. The UE according to claim 1, wherein
a size of the MAC CE is determined based on a larger number between the total number of the one or more CSI trigger states within the first list and the total number of the one or more CSI trigger states within the second list.

4. A base station, comprising:
transmission circuitry configured to transmit, to a user equipment (UE), a first radio resource control (RRC) parameter including a first list of one or more channel state information (CSI) trigger states, a second RRC parameter indicating a first total number of bits N_TS1 for a first CSI request field of a first downlink control information (DCI) format, a third RRC parameter including a second list of one or more CSI trigger states, and a fourth RRC parameter indicating a second total number of bits N_TS2 for a second CSI request field of a second DCI format; and
processing circuitry configured to determine a CSI trigger state, and generate a CSI request field of a DCI format based on the determined CSI trigger state, wherein:
the transmission circuitry is further configured to transmit a medium access control (MAC) control element (CE),
in a first case that a total number of the one or more CSI trigger states within the first list is greater than $2^{N\_TS1}-1$, the processing circuitry is further configured to select at least one of the one or more CSI trigger states out of the first list which is mapped to one or more codepoints of the first CSI request field of the first DCI format, and the at least one of the one or more CSI trigger states out of the first list is selected based on the MAC CE including a 1-bit field being set to 0, and in a second case that a total number of the one or more CSI trigger states within the second list is greater than $2^{N\_TS2}-1$, the processing circuitry is further configured to select at least one of the one or more CSI trigger states out of the second list which is mapped to one or more codepoints of the second CSI request field of the second DCI format, and the at least one of the one or more CSI trigger states out of the second list is selected based on the MAC CE including the 1-bit field being set to 1.

5. The base station according to claim 4, wherein:
a total number of the at least one of the one or more CSI trigger states out of the first list is up to $2^{N\_TS1}-1$ CSI trigger states, and
a total number of the at least one of the one or more CSI trigger states out of the second list is up to $2^{N\_TS2}-1$ CSI trigger states.

6. The base station according to claim 4, wherein
a size of the MAC CE is determined based on a larger number between the total number of the one or more CSI trigger states within the first list and the total number of the one or more CSI trigger states within the second list.

7. A method performed by a user equipment (UE), the method comprising:
receiving, from a base station, a first radio resource control (RRC) parameter including a first list of one or more channel state information (CSI) trigger states, a second RRC parameter indicating a first total number of bits N_TS1 for a first CSI request field of a first downlink control information (DCI) format, a third RRC parameter including a second list of one or more CSI trigger states, and a fourth RRC parameter indicating a second total number of bits N_TS2 for a second CSI request field of a second DCI format;
determining a CSI trigger state in response to a CSI request field of a DCI format;
receiving a medium access control (MAC) control element (CE);
in a first case that a total number of the one or more CSI trigger states within the first list is greater than $2^{N\_TS1}-1$, selecting at least one of the one or more CSI trigger states out of the first list which is mapped to one or more codepoints of the first CSI request field of the first DCI format, wherein the at least one of the one or more CSI trigger states out of the first list is selected based on the MAC CE including a 1-bit field being set to 0; and
in a second case that a total number of the one or more CSI trigger states within the second list is greater than $2^{N\_TS2}-1$, selecting at least one of the one or more CSI trigger states out of the second list which is mapped to one or more codepoints of the second CSI request field of the second DCI format, wherein the at least one of the one or more CSI trigger states out of the second list is selected based on the MAC CE including the 1-bit field being set to 1.

* * * * *